United States Patent [19]

Arbisi et al.

[11] Patent Number: 4,535,279
[45] Date of Patent: Aug. 13, 1985

[54] IMPULSE MOTOR STRUCTURE, DRIVE SYSTEM AND CONTROL CIRCUIT

[76] Inventors: Dominic Arbisi, 13001 Berkshire Dr., Minnetonka, Minn. 55343; Roger E. Mitchell, 3710 Vincent Ave. South, Minneapolis, Minn. 55410

[21] Appl. No.: 519,203

[22] Filed: Aug. 1, 1983

[51] Int. Cl.$^3$ .............................................. G05B 19/40
[52] U.S. Cl. .................................. 318/696; 318/685; 310/49 R
[58] Field of Search .................... 310/166, 49 R, 68 R, 310/72, 46, 166; 318/696, 685, 725

[56] References Cited

U.S. PATENT DOCUMENTS

| | | | |
|---|---|---|---|
| 2,931,929 | 4/1960 | Snowdon et al. | 310/49 R |
| 3,293,459 | 12/1966 | Kreuter et al. | 310/49 R |
| 4,249,116 | 2/1981 | Hieda | 318/439 X |
| 4,357,551 | 11/1982 | Dulondel . | |

FOREIGN PATENT DOCUMENTS

| | | | |
|---|---|---|---|
| 57-85568 | 5/1982 | Japan | 310/49 R |
| 1439991 | 6/1976 | United Kingdom | 318/696 |

OTHER PUBLICATIONS

J. T. Wilson, IBM Technical Disclosure Bulletin, vol. 15, No. 1, pp. 568–569, Jul. 1972.

*Primary Examiner*—William M. Shoop, Jr.
*Assistant Examiner*—Bentsu Ro
*Attorney, Agent, or Firm*—Kinney & Lange

[57] ABSTRACT

An impulse motor includes a stator and a rotor concentrically mounted about a rotational axis. A plurality of flat primary drive coils are circumferentially arranged around the stator and are connected in a parallel circuit. The primary drive coils are oriented to produce magnetic fields in radial directions when energized. The rotor is positioned inside the stator and has a plurality of electrically conductive elements circumferentially arranged around it. A plane formed by each conductive element is parallel to the rotational axis and is tilted a predetermined angle off a perpendicular formed with a radial axis. The magnetic fields produced by the primary drive coils induce circulating currents in the conductive elements. The circulating currents in the conductive elements in turn produce magnetic fields in directions generally orthogonal to the plane of the conductive elements. The magnetic fields of the conductive elements and the primary drive coils interact to create opposing forces with a resultant circumferential component which causes rotational motion of the rotor.

18 Claims, 4 Drawing Figures

IMPULSE MOTOR STRUCTURE, DRIVE SYSTEM AND CONTROL CIRCUIT

BACKGROUND OF THE INVENTION

1. Field of the Invention.

The present invention relates to electric motors. In particular, the present invention is an impulse motor which utilizes electric energy stored in capacitors to produce interactive magnetic fields.

2. Description of the Prior Art.

Electric motors have become a mainstay of everyday life. No home, factory or place of business could function without them. Many different types of motors have been developed to meet this myriad of uses. DC motors, for example, may be of the shunt or series type. An AC motor may be a synchronous, or an induction machine.

Functional characteristics of each type vary. Efficiency, speed range, speed stability, load capacity, power requirements, and starting ability are important operating characteristics. Typically, the environment and application to which the motor is to be put will dictate a set of operating parameters. Characteristics of specific motors must then be matched to these parameters in order to arrive at the correct motor type for the application. Use therefore dictates choice.

It may be readily understood that there is a continuing need for new types of motors which enable the designer to better match the motor to the application. In particular, there is a continuing need for new motors having reduced weight and higher efficiencies.

SUMMARY OF THE INVENTION

The present invention is an impulse motor which utilizes air core coils thereby reducing hysteresis and eddy current losses. The impulse motor includes a shaft which defines a rotational axis. A cylindrically shaped stator is centered about the rotational axis. The stator contains a plurality of primary drive coils which are circumferentially arranged on a first track. The primary drive coils of the first track are connected in a parallel circuit and each is oriented to produce a magnetic field in radial directions. A rotor is concentrically arranged with the stator and is connected to the shaft for rotation with respect to the stator about the rotational axis. The rotor contains a plurality of electrically conductive elements which are circumferentially arranged. Each electrically conductive element has a first and a second dimension which are perpendicular to one another and define a plane. The first dimension is parallel to the rotational axis. The second dimension forms an angle which is not a perpendicular to a radial axis.

When energized, the primary drive coils induce circulating currents in the conductive elements. The circulating currents, in return, create a magnetic field in a direction generally orthogonal to the plane formed by the conductive element. The magnetic fields of the conductive elements and the primary drive coils interact to create a force which has a circumferential component, thereby resulting in rotational motion of the rotor and shaft.

A preferred embodiment of the present invention contains a second track of primary drive coils. The second track of primary drive coils is circumferentially arranged around the stator and is positioned adjacent and generally parallel to the first track of primary drive coils. Each primary drive coil of the second track also produces a magnetic field in the radial direction. The first and second tracks of primary drive coils are energized by pulses of electric energy from first and second capacitor means, respectively. The energy pulses are sequenced in such a manner that the current flowing through the first track of primary drive coils is used to charge the second capacitor means. The second capacitor means is then used to energize the second track of primary drive coils while the first capacitor means is being recharged.

DETAILED DESCRIPTION OF THE PREFERRED EMBODIMENTS

Figure 1:
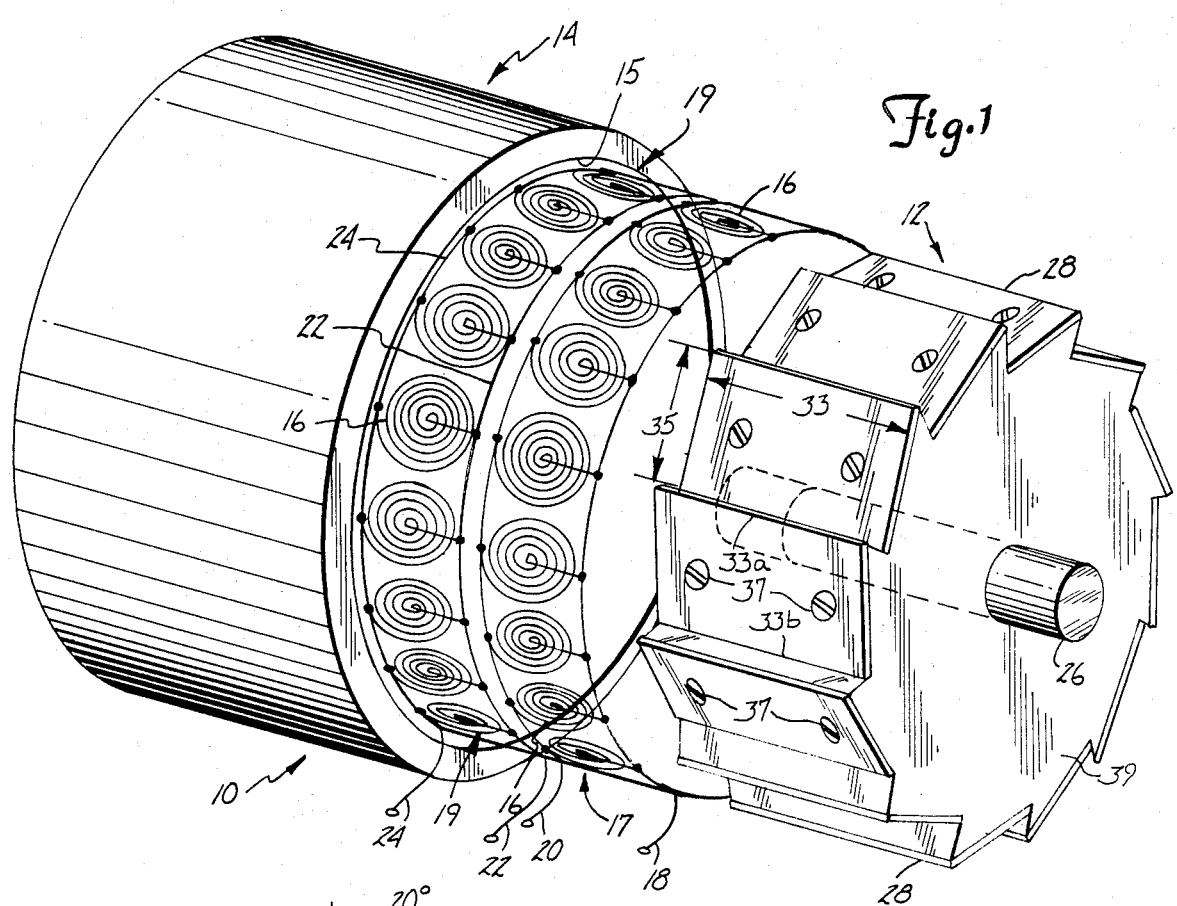
FIG. 1 is an exploded view of a preferred embodiment of the impulse motor of the present invention.

As shown in exploded form in FIG. 1, impulse motor 10 of the present invention includes a rotor 12 positioned within a stator 14. An inner surface 15 of stator 14 has a generally cylindrical shape. Stator 14 is fashioned from any rigid nonmagnetic material durable enough to withstand the environment in which the motor is placed and used.

Circumferentially positioned within stator 14 are a plurality of primary drive coils 16. Each primary drive coil 16 is a flat air core coil with two leads. The number of turns making up the coil as well as the gauge of wire used varies with motor rating and application. In preferred embodiments the primary drive coils 16 are mounted within counter bores in stator 14 so that they are flush with inner surface 15. An adhesive is used to fasten primary drive coils 16 to stator 14.

Primary drive coils 16 are mounted on inner surface 15 of stator 14 in a first track 17 and a second track 19. In preferred embodiment of the present invention, centers of primary drive coils 16 are spaced approximately 20° apart around the stator. The first track 17 of primary drive coils 16 is defined by first track leads 18 and 20. First track leads 18 and 20 are parallel to each other and run circumferentially around the stator. First track lead 18 represents an input lead and is connected to an input lead of each primary drive coil 16. First track lead 20 represents an output lead and is connected to an output lead of each primary drive coil 16. The plurality of primary drive coils 16 on the first track 17 are therefore interconnected to form a parallel circuit. Each primary drive coil 16 of the first track 17 is energized when current is supplied to first track leads 18 and 20.

The second track 19 is defined by second track leads 22 and 24. The second track 19 is positioned circumferentially on the inner surface 15 of stator 14 and is parallel to and in close spatial position with the first track 17 of primary drive coils 16. The primary drive coils 16 of second track 19 are interconnected with second track leads 22 and 24 to form a parallel circuit. The second track 19 of primary drive coils 16 is in all other respects identical to first track 17.

Figure 2:
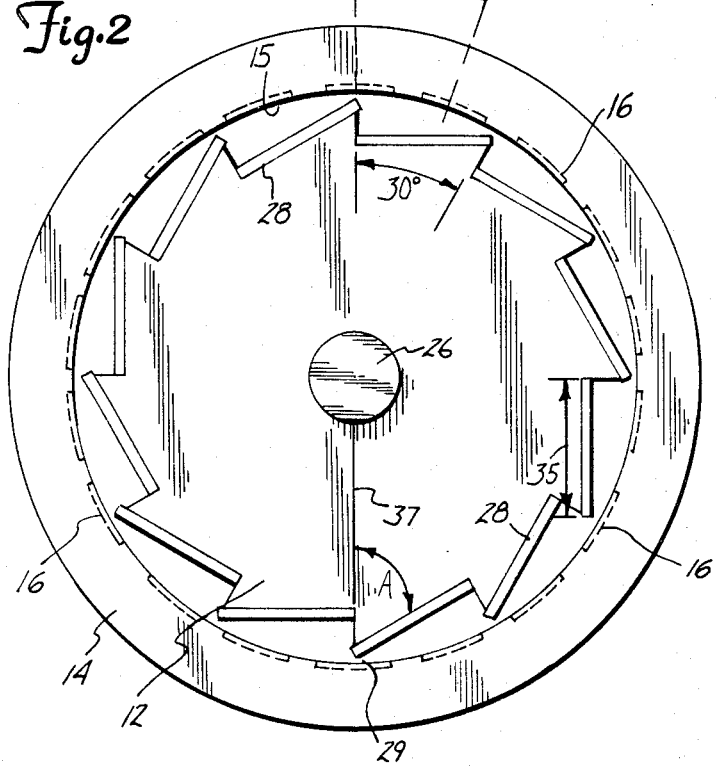
FIG. 2 is an end view of the impulse motor showing the rotor mounted within the stator.

Rotor 12 of impulse motor 10 is mounted on shaft 26 and is formed of hub 39 and a plurality of electrically conductive elements 28. Electrically conductive elements 28 are circumferentially mounted about the radius of hub 39. As shown in FIG. 1, each conductive element forms a plane having a width 33 and length 35. Each conductive element 28 also has a leading edge 33a and a trailing edge 33b. The conductive elements 28 are positioned on hub 39 so that leading edge 33a and trailing edge 33b are parallel to shaft 26. As best shown in FIG. 2, length 35 forms an angle A with a radial axis 37. Leading edge 33a of each conductive element 28 is therefore a greater radial distance from shaft 26 than is trailing edge 33b. Hub 39 of rotor 12 is fashioned from any nonmetallic material which is able to withstand the forces developed by the motor when it is operating. In preferred embodiments hub 39 is plastic disc which has a width equal to width 33 of conductive elements 28.

In one preferred embodiment of impulse motor 10, the conductive elements 28 are metal flats of a paramagnetic metal such as aluminum. In preferred embodiments, the conductive elements 28 leading edges 33a spaced circumferentially about rotor 12 at 30° intervals. Since coils 16 are preferably spaced 20° from center-to-center, each conductive element 28 overlaps two primary drive coils 16 at all times during rotation of rotor 12. The conductive elements 28 are attached to plastic disc 39 rotor 12 by fasteners such as screws 37. Rotor 12 is mounted within stator 14 in such a manner that only a small air gap 29 exists between the outer edge of rotor 12 and coils 16.

Operation of impulse motor 10 is the result of interactive magnetic fields. Current pulses of large magnitude are periodically applied to first and second tracks 17 and 19 of primary drive coils 16. Each primary drive coil 16 produces a magnetic field in the radial direction toward drive shaft 26 when energized by the current pulses. The magnitude of the work performed by the instantaneous magnetic field is proportional to the capacitance and the square of the voltage applied to each primary drive coil 16.

Figure 3:
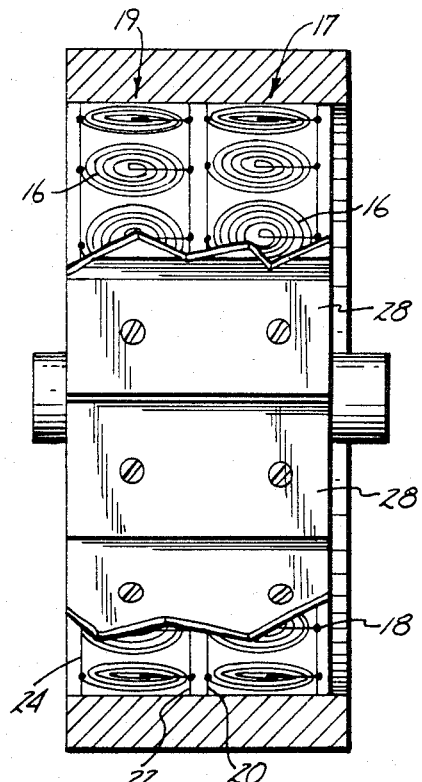
FIG. 3 is a cut-away side view of the impulse motor showing the relative positioning of the drive coils and the conductive elements.

FIG. 3 shows the relative positioning of rotor 12 within stator 14. Rotor 12 is positioned within stator 14 so that conductive elements 28 are concentric with first and second tracks 17 and 19 of primary drive coils 16. Since the primary drive coils 16 are spaced very close to conductive elements 28, separated only by air gap 29, the magnetic field developed by the primary drive coils 16 impinges upon the conductive elements 28. As a result of the changing magnetic field developed by primary drive coils 16, circulating currents are induced in conductive elements 28. The circulating currents always tend to flow perpendicular to the magnetic field and in such a direction as to oppose any changes in that magnetic field. The circulating currents, therefore, develop their own magnetic field which will be in a direction generally orthogonal to the conductive elements 28. The opposing magnetic fields produced by the primary drive coils 16 and the circulating currents in conductive elements 28 interact to create a force on conductive elements 28 and primary drive coils 16. The opposing magnetic fields are not exactly opposite each other, but instead are separated by an angle of 90°-A because of the tilt of conductive elements 28. The resultant force is therefore not directly in the radial direction, but instead has a component which is orthogonal to the radial direction and is in the circumferential direction. This force component results in rotational motion of rotor 12 and shaft 26.

Although metal flats are a preferred form for conductive elements 28 due to their inherent simplicity and ease of fabrication, other conductive elements 28 can take other forms as well. For example, conductive elements 28 can in other embodiments, be flat or cylindrical wound coils which have opposite ends of the coil wire connected together to form a closed loop. In still other embodiments, conductive elements 28 are metal, but are curved rather than flat. The important properties of conductive elements 28 in all of these embodiments are the ability to have circulating currents induced by magnetic fields and the tilted orientation with respect to a plane perpendicular to the radial direction.

Figure 4:
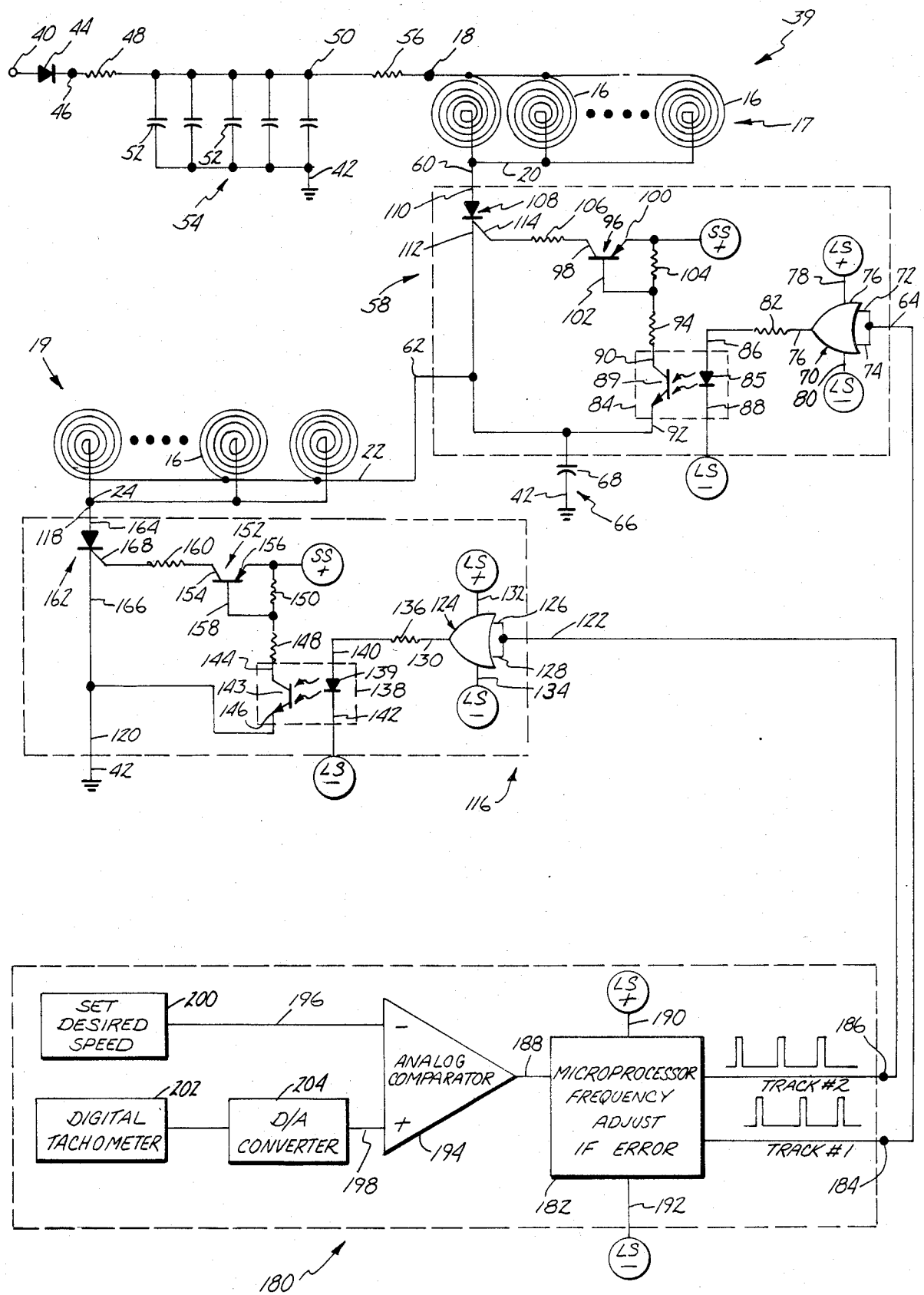
FIG. 4 is a schematic representation of the drive system and control system for the impulse motor.

A drive system 39 for impulse motor 10 is schematically represented in FIG. 4. A high voltage AC or DC supply potential is applied between supply input terminal 40 and supply ground 42. Rectifier diode 44 is connected between supply input terminal 40 and node 46. Resistor 48 is connected between node 46 and node 50. A plurality of high voltage capacitors 52 are connected in a parallel circuit between node 50 and supply ground 42. The plurality of high voltage capacitors 52 form a first capacitor bank 54 used to store electric energy which will be selectively applied to first track 17 of primary drive coils 16. Resistor 56 is connected between node 50 and first lead 18.

First switching circuit 58 has a first and second terminals 60 and 62 connected to control the flow of electric current from first capacitor bank 54 through first track 17 of primary drive coils 16 as a function of a first control signal and received at control terminal 64. The first control signal is preferably a pulse train which has first and second logic levels. When the second level (e.g. a logic "low" or "0") of the first control signal is applied to control terminal 64, first switching circuit 58 is in its "off" state. When in its "off" state, first switching circuit 58 functions as an open circuit between terminals 60 and 62. During this period of time, capacitor bank 54 is being recharged by current flowing from input terminal 40 through diode 44 and resistor 48, and no current flows through first track 17 of primary drive coils 16.

When the first level (e.g. a logic "high" or "1") of the first control signal is applied to control terminal 64, first switching circuit 58 is switched to its "on" state. When in its "on" state, first switching circuit 58 functions as a closed circuit between terminals 60 and 62. During this time period current from the first capacitor bank 54 flows through and energizes primary drive coils 16 of first track 17. Current flow through primary drive coils 16 of first track 17 is then directed to, and charges a second capacitor bank 66. Second capacitor bank 66 is formed by one or more capacitors 68 interconnected in a parallel circuit between terminal 62 of first switching circuit 58 and supply ground 42. In a preferred embodiment of the present invention, the capacitance of second capacitor bank 66 is much less than that of first capacitor bank 54. The electric current used to energize the first track of primary drive coils 16 is therefore used to charge the second capacitor bank 66.

In the preferred embodiment of the present invention shown in FIG. 4, several individual circuit elements form first switching circuit 58. First OR gate 70 has two input terminals 72 and 74, an output terminal 76 and logic supply terminals 78 and 80. Logic supply terminal 78 is connected to receive a relatively positive logic supply potential (LS+), while logic supply terminal 80 is connected to receive a relatively negative logic supply potential (LS−). Input terminals 72 and 74 are both connected to control terminal 64 to receive the first control signal. OR gate 70 acts as a buffer, and converts the first control signal to voltage levels compatible with other circuit elements of first switching circuit 58. Resistor 82 has a first terminal connected to output 76 of first OR gate 70. First isolation means 84 is an optoelectric device which includes a light emitting diode 85 having an anode 86 and a cathode 88. Isolation means 84 also includes a phototransistor 89 having a collector 90 and an emitter 92. Anode 86 is connected to a second terminal of resistor 82, while cathode 88 is connected to the relatively negative logic supply potential (LS−). Emitter 92 is connected to terminal 62 of first switching circuit 58. Resistor 94 has a first terminal connected to the collector 90 of first isolation means 84. Transistor 96 has a collector 98, an emitter 100 and a base 102. Base 102 is connected to a second terminal of resistor 94. Emitter 100 is connected to receive a relatively positive switching supply potential (SS+). Resistor 104 is connected between base 102 and emitter 100 of transistor 96. Resistor 106 has a first terminal connected to collector 98 of first switching transistor 96. Silicon controlled rectifier (SCR) 108 has an anode 110, a cathode 112 and a gate 114. Anode 110 is connected to first terminal 60 of first switching circuit 58 while cathode 112 is connected to terminal 62 of first switching circuit 58. Gate 114 of SCR 108 is connected through resistor 106 to collector 98. Firing of SCR 108 is initiated by a potential applied to gate 114 through transistor 96. SCR 108 is commutated after a discharge of capacitor bank 54 as a result of voltage match between capacitor banks 54 and 66.

Second track 19 of primary drive coils 16 has its input track lead 22 connected to terminal 62 of first switching circuit 58.

Second switching circuit 116 controls current flow between first and second terminals 118 and 120 as a function of a second control signal received at control terminal 122. The control signal is, like the first control signal, a pulse train having first and second logic levels. Terminal 118 is connected to output lead 24 of second track 19 of primary drive coils 16. Terminal 120 is connected to supply ground 42. Control terminal 122 is connected to receive a second control signal. Second switching circuit 116 functions exactly as first switching circuit 58, but instead controls the flow of current from second capacitor bank 66 through the second track 19 of primary drive coils 16. When the second level (e.g. "low or "0") of the second control signal is applied to control terminal 122, second switching circuit 116 is in its "off" state. In its "off" state second switching circuit 116 acts as an open circuit, and no current flows through second track 19 of primary drive coils 16. When the first level of the second control signal is applied to control terminal 122, second switching circuit 116 is in its "on" state. When in its "on" state, second switching circuit 116 functions as a closed circuit, and allows current to flow from second capacitor bank 66 through the primary drive coils 16 of second track 19.

Second switching circuit 116 is formed by a number of circuit elements. Second OR gate 124 contains input terminals 126 and 128, output terminal 130 and logic supply terminals 132 and 134. Logic supply terminal 132 is connected to receive a relatively positive logic supply potential (LS+), while logic supply terminal 134 is connected to receive a relatively negative logic supply potential (LS−). Input terminals 126 and 128 are connected together, and are in turn connected to control terminal 122 of second switching circuit 116. OR gate 124 functions as a buffer and converts the second control signal into logic level potentials at output terminal 130 which are compatible with the rest of the circuit elements of second switching circuit 116. Resistor 136 has a first terminal connected to output 130 of OR gate 124. Isolation means 138 is an optoelectronic device containing a light emitting diode 139 having an anode 140 and a cathode 142, and containing a phototransistor 143 having a collector 144 and an emitter 146. Anode 140 is connected to a second terminal of resistor 136. Cathode 142 is connected to receive the relatively negative logic supply potential (LS−). Emitter 146 is connected to supply ground 42. Resistor 148 has a first terminal connected to collector 144 of isolation means 138. Resistor 150 has a first terminal connected to a second terminal of resistor 148. A second terminal of resistor 150 is connected to receive the relatively positive switching supply potential (SS+). Transistor 152 includes a collector 154, an emitter 156 and a base 158. Base 158 is connected to the first terminal of resistor 150, while emitter 156 is connected to a second terminal of resistor 150. Resistor 160 has a first terminal connected to collector 154 of transistor 152. Silicon controlled rectifier (SCR) 162 includes anode 164, cathode 166 and gate 168. Anode 164 is connected to terminal 118, and cathode 166 is connected to terminal 120 and thus to supply ground 42. Gate 168 is connected to a second terminal of resistor 160. Firing of SCR 162 is initiated by a potential applied to gate 168 through transistor 152. SCR 162 is commutated when capacitor bank 66 is fully discharged.

Control system 180 for impulse motor 10 is also shown in FIG. 4. The primary element of control system 180 is microprocessor control 182 which generates first and second control signals. The first control signal is provided at a first output terminal 184, while the second control signal is provided at a second output terminal 186. Microprocessor control 182 also includes an input terminal 188 and first and second logic supply terminals 190 and 192, respectively. First logic supply terminal 190 is connected to receive a relatively positive logic supply potential (LS+), while second logic supply 192 is connected to receive a relatively negative logic supply potential (LS−). Microprocessor control 182 preferably includes a microprocessor or microcomputer with associated program and read/write storage, clock circuitry, and interface circuitry.

The first and second control signals produced by microprocessor control 182 consist of a series of pulses. The pulses have a second level, which when applied to the respective switching circuit, will cause the switching circuit to be in its "off" state, and a first level which when applied to the respective switching circuit will cause the switching circuit to be in its "on" state. The first and second control signals are sequenced by microprocessor 182 in such a manner that they are 180° out of phase with respect to each other. In this manner, when the first level of the first control signal is supplied to the input of first switching circuit 58, first capacitor bank 54 is discharged through the first track 17 of primary drive coils 16 with the current used to charge second capacitor bank 66. During this time period second switching circuit 116 is in its "off" state, and no current flows through second track 19 of primary drive coils 16. Exactly 180° later in the cycle, the first control signal applied to control terminal 64 of first switching circuit 58 has a second level. First switching circuit 58 is, therefore, in its "off" state and capacitor bank 54 is being recharged by the high voltage supply. During this time period, a first level of the second control signal is applied to control terminal 122 of second switching circuit 116. Second switching circuit 116 is, therefore, in its "on" state, allowing current to flow from capacitor bank 66 through second track 19 of primary drive coils 16. In this manner it can be seen that the first and second track of primary drive coils 16 are alternately energized. The duty cycle of the first and second control signals is relatively low, therefore keeping the respective switching circuits in their "off" state most of the time. This low duty cycle tends to minimize motor heating.

The frequency of the first and second control signals is determined by microprocessor control 182 as a function of an input signal applied to input terminal 188. In one preferred embodiment of the present invention, the input signal is an analog voltage potential indicative of the difference between a desired motor speed and an actual motor speed. This analog signal is produced by analog comparator 194 and is converted by an analog-to-digital converter which is a part of the interface circuitry of microprocessor control 182. Analog comparator 194 has applied to its input terminal 196 an analog potential from speed selector 200 indicative of the desired motor speed. An analog signal indicative of the actual motor speed (and, for example, produced by digital tachometer 202 and digital-to-analog converter 204) is applied to input terminal 198. Alternatively, both a digital signal representative of the desired motor speed from speed selector 200 and a digital signal from digital tachometer 202 can be supplied directly to microprocessor control 182.

In either embodiment, the frequency is preferably controlled as a function of the sign and the magnitude of the error. For example, if the actual speed is less than the desired speed, the frequency is increased, and vice versa. The amount of increase or decrease in frequency is based upon the magnitude of the speed error.

In summary, the impulse motor of the present invention has many advantages over the prior art. Rotational motion is produced by interacting magnetic fields from coils and conductive elements. As a result, many components of the motor may be made of relatively lightweight material, such as plastics. Most motors of the prior art require the stator and rotor to be metal. This adds weight and reduces efficiency. Since the duty cycle of the primary drive coils is relatively low, the current being applied in microsecond intervals, customary motor heating is greatly reduced. The air core magnetic coils used for primary drive coils result in lower hysteresis and circulating current losses compared to the typical iron core coils used in most motors.

Although the present invention has been described with reference to preferred embodiments, workers skilled in the art will recognize that changes may be made in form and detail without departing from the spirit and scope of the invention. For example, the capacitor size, supply potential, wire gauge and material of the structural elements, to name a few, are dependent on motor rating.

What is claimed is:

1. An impulse motor comprising:
a stator having a cylindrically shaped surface centered about a rotational axis, the stator including a plurality of primary drive coils circumferentially arranged in a first track and connected to form a parallel circuit, the primary drive coils positioned near the surface of the stator and oriented to produce a magnetic field in radial directions when energized; and
a rotor centered about the rotational axis and positioned for rotation with respect to the stator, the rotor including a plurality of electrically conductive elements circumferentially mounted about a radius of the rotor, each electrically conductive element having a first and second dimension, the first dimension being parallel to the rotational axis and the second dimension forming an angle which is not perpendicular to a radial axis, the magnetic fields of the primary drive coils inducing circulating currents into the conductive elements and the circulating currents creating a magnetic field generally orthogonal to a plane defined by the first and second dimensions, the magnetic fields of the conductive elements and the primary drive coils interacting to create a force having a component perpendicular to both the radial axis and the rotational axis resulting in rotational motion of the rotor.

2. The impulse motor of claim 1 wherein the electrically conductive elements are metal flats having first and second edges, the metal flats positioned on the rotor so that the first and second edges are parallel to the rotational axis with the first edge being a first radial distance and the second edge being a second different radial distance from the rotation axis.

3. The impulse motor of claim 2 wherein the metal flats are formed of paramagnetic metal.

4. The impulse motor of claim 3 wherein the rotor includes a hub formed of plastic material which has a width equal to a width of the conductive elements.

5. The impulse motor of claim 1 wherein the primary drive coils are essentially flat, have an air core and are circularly wound.

6. The impulse motor of claim 1 and including a plurality of primary drive coils circumferentially arranged in a second track and connected to form a parallel circuit, the primary drive coils positioned near the surface of the stator and oriented to produce a magnetic field in radial directions when energized.

7. The impulse motor of claim 6 and including means for periodically energizing the primary drive coils of the first and second tracks.

8. The impulse motor of claim 7 wherein means for periodically energizing the primary drive coils of the first and second tracks applies current pulses to the coils of the first and second tracks.

9. The impulse motor of claim 8 wherein the means for periodically energizing the primary drive coils causes the current pulses applied to the primary drive coils of the first track to be 180° out of phase with respect to the current pulses applied to the second track of primary drive coils.

10. The impulse motor of claim 9 wherein the means for periodically energizing controls a frequency of the current pulses applied to the first and second tracks of primary drive coils as a function of an actual motor speed signal and a desired motor speed signal.

11. The impulse motor of claim 7 wherein the means for periodically energizing the first and second track of primary drive coils comprises:
first capacitor means for storing electric energy;
first switching means having an "on" and an "off" state for controlling the flow of electric energy from the first capacitor means through the first track of primary drive coils, the first switching means having first and second terminals connected in series with the first capacitor means and the first track of coils and a control terminal connected to receive a first control signal, the first switching means acting as a closed circuit in its "on" state allowing electric energy to flow from the first capacitor means through the first track of primary drive coils when the first control signal has a first level, and acting as an open circuit in its "off" state when the first control signal has a second level;

second capacitor means connected to the second terminal of the first switching means for storing the electric energy which flowed through the first track of primary drive coils when the first switching means was in its "on" state;

second switching means having an "on" and an "off" state for controlling the flow of electric energy from the second capacitor means through the second track of primary drive coils, the second switching means having first and second terminals connected in series with the second capacitor means and the second track of coils and a control terminal connected to receive a second control signal, the second switching means acting as a closed circuit in its "on" state and allowing energy to flow from the second capacitor means through the second track of primary drive coils when the second control signal has a first level, and acting as a open circuit in its "off" state when the second control signal has a second level; and means for providing the first and second control signals.

12. The impulse motor of claim 11 wherein the means for providing the first and second control signals comprises:

means for providing a desired speed signal which is a function of a desired motor speed;

means for providing an actual speed signal which is a function of actual speed of the motor; and means for producing the first and second control signals as a function of the desired speed signal and the actual speed signal.

13. The impulse motor of claim 12 wherein the means for providing the first and second control signals causes frequency of the first and second control signals to increase when the actual motor speed is less than the desired motor speed, and decrease when the actual motor speed is greater than the desired motor speed.

14. The impulse motor of claim 1 and further including means for periodically energizing the primary drive coils of the first track.

15. The impulse motor of claim 14 wherein the primary drive coils of the first track are energized by current pulses from the means for periodically energizing and wherein a frequency of the current pulses is a function of an actual motor speed and a desired motor speed.

16. An impulse motor comprising:

a stator of cylindrical shape positioned about a rotational axis and containing a plurality of primary drive coils circumferentially arranged around the stator in a first track, each primary drive coil of the first track being oriented to produce a magnetic field in a radial direction when energized; and a rotor positioned for rotation about the rotational axis and containing a plurality of electrically conductive elements circumferentially arranged around the rotor; each electrically conductive element being oriented parallel to the rotational axis and tilted with respect to a plane orthogonal to a radial axis, the primary drive coils when energized inducing circulating currents in the conductive elements thereby creating opposing forces between the conductive elements and the primary drive coils, a sum of the opposing forces including a circumferential component which causes rotational motion of the rotor; and means for periodically energizing the coils of the first track.

17. An impulse motor comprising:

a stator having a surface of cylindrical shape and centered about a rotational axis, the stator containing a plurality of primary drive coils circumferentially arranged about it on a first and a second track, the first and second tracks being adjacent with and parallel to each other, the primary drive coils of the first track and the second track being connected to form first and second parallel circuits, respectively, each coil being oriented to produce a magnetic field in a radial direction when energized;

a rotor positioned for rotation about the rotational axis and containing a plurality of electrically conductive elements circumferentially arranged around the rotor, a plane formed by each conductive element being parallel to the axis and tilted a predetermined angle off a perpendicular formed with a radial axis, the primary drive coils inducing circulating currents in the conductive elements thereby creating opposing forces between the conductive elements and the primary drive coils, sum of the opposing forces having a component orthogonal to the radial and rotational axes and resulting in rotational motion of the rotor;

first capacitor means for storing electric energy;

first switching means having an "on" and an "off" state for controlling the flow of electric energy from the first capacitor means through the first track of primary drive coils as a function of a first control signal, the first switching means acting as a closed circuit in its "on" state allowing electric energy to flow from the first capacitor means through the first track of primary drive coils when the first control signal has a first level, and acting as an open circuit in its "off" state when the first control signal has a second level;

second capacitor means for storing electric electric energy which flowed through the first track of primary drive coils when the first switching means was in its "on" state;

second switching means having an "on" and an "off" state for controlling the flow of electric energy from the second capacitor means through the second track of primary drive coils as a function of a second control signal, the second switching means acting as a closed circuit in its "on" state and allowing energy to flow from the second capacitor means through the second track of primary drive coils when second control signal has a first level, and acting as a closed circuit in its "off" state when the second control signal has a second level; and means for providing the first and second control signals.

18. An impulse motor comprising:

a stator having a surface of cylindrical shape and centered about a rotational axis, the stator containing a plurality of primary drive coils circumferentially arranged on the surface in a first track, each primary drive coil being connected in a parallel circuit and oriented to produce a magnetic field in a radial direction when energized;

a rotor positioned for rotation about the rotational axis and containing a plurality of electrically conductive elements circumferentially arranged around the rotor, each electrically conductive element forming a plane parallel to the rotational axis and having first and second edges, the conductive elements positioned on the rotor so that the first and second edges are parallel to the rotational axis with the first edge being a first radial distance and the second edge being a second different radial distance from the rotational axis, so that the magnetic fields produced by the primary drive coils induce circulating currents in the conductive elements and the circulating currents in turn create magnetic fields generally orthogonal to the plane defined by the conductive elements, the magnetic fields of the primary drive coils and the conductive elements interacting to create opposing forces including a circumferential component which causes rotational motion of the rotor; and means for periodically energizing the coils of the first track.

* * * * *